US008571157B2

(12) United States Patent
Chiou et al.

(10) Patent No.: US 8,571,157 B2
(45) Date of Patent: Oct. 29, 2013

(54) SYSTEM FOR AND METHOD OF VALIDATING A VOIP TELEPHONE NUMBER ORDER

(75) Inventors: Gou-Shiow Chiou, Plano, TX (US); Michael Hilden, Richardson, TX (US); Harneet Ghumman, Allen, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 614 days.

(21) Appl. No.: 12/613,878

(22) Filed: Nov. 6, 2009

(65) Prior Publication Data

US 2011/0110361 A1    May 12, 2011

(51) Int. Cl.
*H04L 12/66* (2006.01)
(52) U.S. Cl.
USPC .......................................... 375/352
(58) Field of Classification Search
None
See application file for complete search history.

(56) References Cited

U.S. PATENT DOCUMENTS

| 2002/0154626 A1* | 10/2002 | Ryu ............................... 370/352 |
| 2003/0216987 A1* | 11/2003 | Mollett et al. ................... 705/35 |
| 2003/0216989 A1* | 11/2003 | Mollett et al. ................... 705/35 |
| 2006/0056287 A1* | 3/2006  | Paden et al. .................... 370/225 |
| 2007/0047706 A1* | 3/2007  | Starling .................... 379/114.03 |

* cited by examiner

*Primary Examiner* — Minh-Trang Nguyen

(57) ABSTRACT

A system for and method of validating a VoIP telephone number order is presented. The described systems and methods may allow for corrupt telephone numbers to be discovered and placed in a corrupt telephone number pool. To this end, data may be mined from class 5 switches and VoIP routers and then compared to the telephone numbers in the order. If a telephone number is found to be corrupt, it may be removed from the order and stored in the corrupt telephone number repository for later review. The ordering process for any other requested telephone numbers may then continue on without interruption to the processing of the entire order.

10 Claims, 4 Drawing Sheets

SYSTEM FOR AND METHOD OF VALIDATING A VOIP TELEPHONE NUMBER ORDER

BACKGROUND INFORMATION

In a conventional Voice over Internet Protocol ("VoIP") system for ordering new telephone numbers, a system requires user groups to reject orders when one telephone number is considered corrupt. This occurs because conventional processing of a VoIP order includes an attempt to update the switching device, which can result in an error condition to the originator of the order (e.g., the customer). Consequently, the customer has to change that particular telephone number and reprocess the order. If more than one telephone number is considered corrupt per customer order, this process repeats itself until all corrupt telephone numbers are discovered and removed from the order.

This conventional system prevents customers from receiving the highest quality of customer care. Further, the conventional system runs the potential of assigning numbers to devices in an incorrect manner.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

The described systems and methods may allow for corrupt telephone numbers to be discovered and placed in a corrupt telephone number pool. To this end, data may be mined from class 5 switches and VoIP routers and then compared to the telephone numbers requested in a customer order. If a telephone number is found to be corrupt, it may be removed from the order and stored electronically in the corrupt telephone number repository for later review. Also, an error code, which may be representative of one or more various reasons that the telephone number was deemed to be corrupt, may be electronically associated with the corrupted telephone number. An error code, if assigned, may be stored electronically alongside the telephone number in the corrupt telephone number repository for later review. The ordering process for any other requested telephones may then continue on without interruption.

Figure 1:
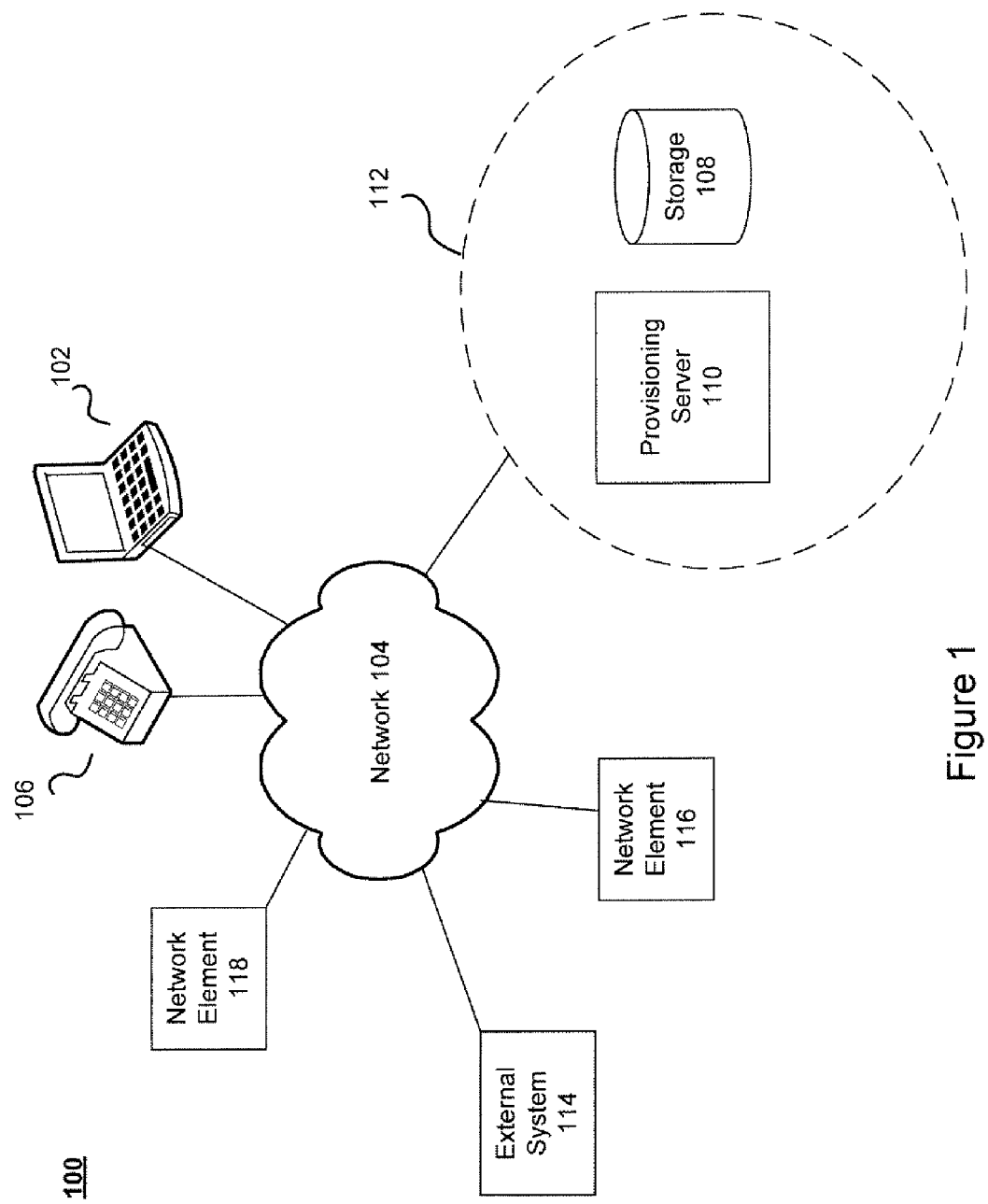
FIG. 1 is a schematic diagram illustrating a system for validating telephone numbers in a network provisioning system, in accordance with an exemplary embodiment.

FIG. 1 is a schematic diagram illustrating a system for validating telephone numbers in a network provisioning system, in accordance with an exemplary embodiment. As illustrated, the system 100 may include one or more networks, such as network 104. A communications device such as communications device 106 may be communicatively coupled to network 104. A computing device 102 may be communicatively coupled with network 104. A provisioning system 112 may be communicatively coupled to network 104. Provisioning system 112 may be communicatively coupled to an external system, such as external system 114 via network 104. Provisioning system 112 may communicate with external system 114 in the performance of the provisioning process. Further, devices such as communications device 106 and computing device 102 may be communicatively coupled to provisioning system 112 via network 104 such that one or more orders for telephone numbers in a VoIP system may be placed from a device such as communications device 106 or computing device 102 and may be received by the provisioning system 112 where provisioning of the one or more orders may take place.

Network 104 may be one or more of a wireless network, a wired network or any combination of wireless network and wired network. For example, network 104 may include one or more of a fiber optics network, a passive optical network, a cable network, an Internet network, a Public Switched Telephone Network (PSTN), a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, network 104 may include, without limitation, telephone line, fiber optics, IEEE Ethernet 802.3, a wide area network ("WAN"), a local area network ("LAN"), or a global network such as the Internet. Also network 104 may support an Internet network, a wireless communication network, a cellular network, or the like, or any combination thereof. Network 104 may further include one, or any number of the exemplary types of networks mentioned above operating as a stand-alone network or in cooperation with each other. Network 104 may utilize one or more protocols of one or more network elements to which they are communicatively coupled. Network 104 may translate to or from other protocols to one or more protocols of network devices. Although network 104 is depicted as a single network, it should be appreciated that according to one or more embodiments, network 104 may each comprise a plurality of interconnected networks, such as, for example, a service provider network, the Internet, a service provider's network, a cable television network, corporate networks, and home networks.

Communication device 106 may be a wireline phone, wireless phone, satellite phone, Personal Digital Assistant (PDA), computer, or other telecommunication capable device. Communication device 106 may be communicatively coupled to the network 104.

Computing device 102 may be a desktop computer, a laptop computer, a server or other computer capable of maintaining response center information. Computing device 102 may receive data from one or more of user input, a network management system, a network provisioning system, a management information base, a network services ordering system, a database, a file, a web service, and an application programming interface.

Communication device 106 and computing device 102 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network connections or telecom connections such as an Ethernet RJ45/Category 5 Ethernet connection, a fiber connection, a traditional phone wireline connection, a cable connection or other wired network connection. Network elements 116 and 118 may use standard wireless protocols including IEEE 802.11a, 802.11b and 802.11g. Network elements 116 and 118 may also be communicatively coupled via protocols for a wired connection, such as an IEEE Ethernet 802.3.

External system 114 may be one or more servers (or server-like devices). External system 114 may include one or more processors (not shown) for recording, transmitting, receiving, and storing data. Although network elements 114 is depicted as an individual server, it should be appreciated that the contents and functionality of external system 114 may be spread across more than one server. External system 114 may include a switch parameter which may maintain switching element data. External system 114 may include an E-911 repository. External system 114 may include a number optimization evaluation system. The number optimization evaluation system may be configured to validate addresses for 9-1-1 purposes. To that end, the number optimization evaluation system may be communicatively coupled with a E-911 repository.

Network elements 116 and 118 may each be one or more servers (or server-like devices), such as a Session Initiation Protocol (SIP) server. Network elements 116 and 118 may be telecom switches, Private Branch Exchanges (PBXs), routers, Voice Response Units (VRUs), announcement servers, voice mail servers or voice portals. Network elements 116 and 118 may be VoIP (Voice Over Internet Protocol) enabled devices. Network elements 116 and 118 may include one or more processors (not shown) for recording, transmitting, receiving, and storing data. Although network elements 116 and 118 are depicted as individual servers, it should be appreciated that the contents of network elements 116 and 118 may be combined into fewer or greater numbers of servers (or server-like devices).

Provisioning system 112 may include a provisioning server such as provisioning server 110. Provisioning system 112 may also include storage 108, which may be used in conjunction with provisioning server 110 to store and process data in conjunction with a provisioning process. Provisioning system 112 may be a network provisioning system that may provide automated provisioning of network elements for telephone numbers ordered by a customer. Provisioning system 112 may provide provisioning of circuit switched based technology, VOIP based technology and other telecommunications equipment. Provisioning system 112 may provision, query, and verify routers, switches, network servers, redirect servers, SIP servers, trunk groups, and other network elements. Although depicted as a single system, provisioning system 112 may be a plurality of systems which may be interfaced, integrated, separate, or managed by a provisioning management system. For example, one provisioning system may be associated with VOIP equipment and one may be associated with circuit switched equipment. Provisioning system 112 may also contain or be integrated with other components or systems such as a workflow management system. The workflow management system may handle sequencing and flow between provisioning tasks (e.g., ensuring that a switch is configured prior to configuring a SIP server or a redirect server to transfer calls to that switch). Provisioning system 112 may use telnet, SNMP (Simple Network Management Protocol), or other protocols to communicate with one or more network elements. Provisioning system 112 may use Service Oriented Architecture (SOA), TCL/TK (Tool Command Language/Tool Kit), and other technologies for network provisioning.

Figure 2:
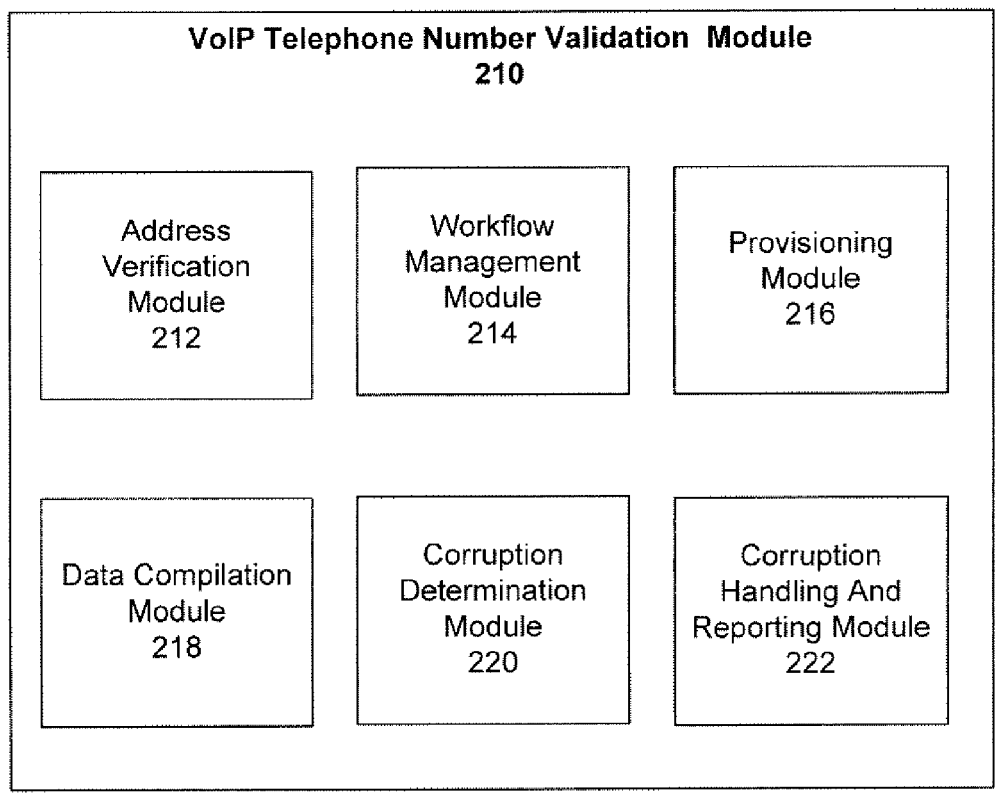
FIG. 2 depicts a block diagram of a hardware module for a telephone number validation tool in a network provisioning system, in accordance with an exemplary embodiment.

FIG. 2 depicts a block diagram of a hardware module for a telephone number validation tool in a network provisioning system, in accordance with an exemplary embodiment. As illustrated, the VoIP telephone number validation module 210 may contain one or more components including an address verification module 212, workflow management module 214, provisioning module 216, data compilation module 218, corruption determination module 220, and corruption handling and reporting module 222.

The address verification module 212 may validate a customer's address for 911 purposes. The validation process may include a number evaluation optimization system. The number evaluation optimization system may check a currently-requested phone number against a 911 repository, such as a 911 repository stored in a consolidated access switch parameter and E-911 repository. The number evaluation optimization system and consolidated access switch parameter and E-911 repository may be external systems which may be accessed via a network (such as network 104 depicted in FIG. 1).

The workflow management module 214 may receive the telephone numbers from the order which may require provisioning and an inquiry into the corruptness or validity of the telephone number. The workflow management module 214 may assign tasks to other modules and may keep track of what tasks have been completed and what tasks still need to be performed. For example, a provisioning module, such as provisioning module 216—which may be, by way of non-limiting example, an internet architecture server application ("IASA")—may accept orders from the workflow management module 216.

The provisioning module 216 may prepare or provision the network equipment so that the ordered telephone number can be used. Provisioning module 216 may provision both the IP network and the switch. Thus, the provisioning module 216 may provision two paths at the same time. The IP network may be provisioned by using an application, such IASA to provision a network server/redirect server ("NS/RS"). The NS/RS may make shift routing decisions in a voice network.

The provisioning module 216 may also perform switch provisioning to prepare or provision the Class 5 local switch. The Class 5 local switch may a 5ESS switch. The Class 5 local switch may be an EWSD switch. The Class 5 local switch may be a DMS switch. A DMS switch may include both option 1 and option 2 data. Option 1 data may refer to legacy accounts from former Worldcom. Option 2 data may refer to legacy accounts from former MCI. Telephone numbers that fall into the category of option 1 versus option 2 data may be classified as such because there may be unique translations associated with legacy accounts. The provisioning of the switch may be performed by an application such as a translation provisioning system ("TPS") to provision the switch device.

The data compilation module 218 may compile information related to telephone numbers into a database so that newly-ordered telephone numbers may be checked against the database to ensure the validity of the telephone number. The data compilation module 218 may compile the telephone number information from Class 5 local switches, such as 5ESS switches, DMS switches, or EWSD switches. The data compilation module 218 may compile voice over IP telephone number information, which may be found in various databases communicatively coupled to a voice over IP network. The data compilation module 218 may compile both retail and wholesale IASA data. Retail IASA data may refer to the telephone number information for VoIP end-user customers. Wholesale IASA data may refer to the telephone number information for VoIP customers who may be repackaging and reselling purchased services.

The corruption determination module 220 may work in conjunction with various other modules described throughout this specification. For example, corruption determination module 220 may work in conjunction with at least such other modules as the corruption handling and reporting module 222, the data compilation module 218, and the provisioning module 216. Indeed, though the functions of the corruption determination module 220 are described here separately, they may be performed as part of the provisioning process. Corruption determination module 220 may access information acquired and stored by the data compilation module 218 and may check a newly ordered telephone number against the telephone numbers stored into a database by the data compilation module 218 to see if the number has already been taken, specified as inactive, or allocated for another purpose.

If the corruption determination module 220 classifies a number as corrupt for any of the various possible reasons, an error code may be created and associated with the number. The error code may be representative of the reason the telephone was deemed to be corrupt and was not validated. Both the telephone number and its associated error code may be set aside and stored in a pre-allocated computer readable storage area.

The corruption handling and reporting module 222 may allocate computer readable storage so that information regarding corrupt telephone numbers (e.g. the telephone numbers themselves, error codes indicating why a particular telephone number is considered corrupt, etc.) may be set aside and stored so that other telephone numbers may be provisioned and validated and the process of provisioning multiple telephone numbers and determining whether multiple telephone numbers are corrupt is not interrupted as a result of a single instance of a corrupt or invalid telephone number.

Figure 3:
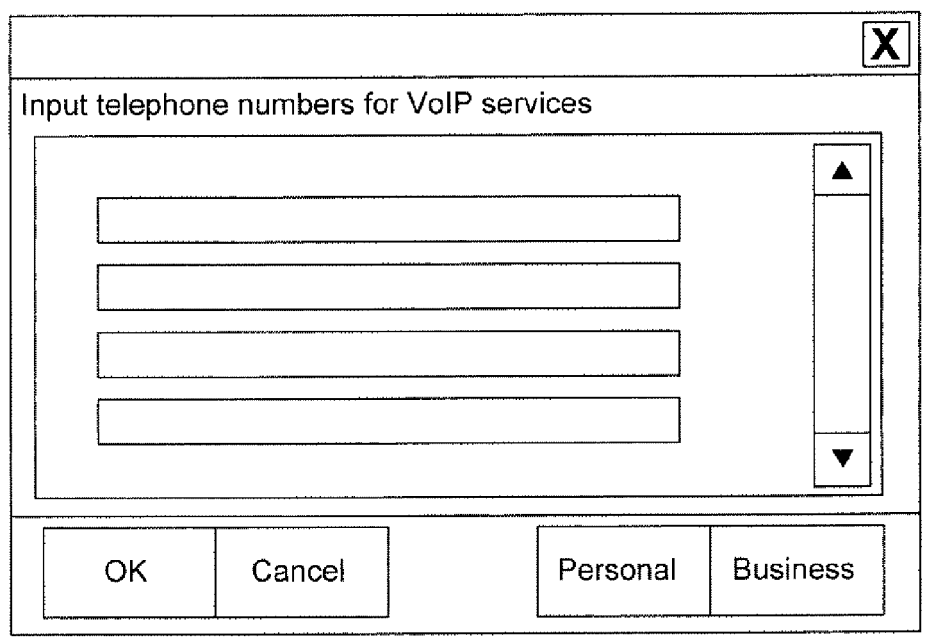
FIG. 3 depicts a user interface for ordering telephone numbers in a VoIP system, in accordance with an exemplary embodiment.

FIG. 3 depicts a user interface for ordering telephone numbers in a VoIP system, in accordance with an exemplary embodiment. The depicted interface may be an interface displayed to a customer who may be ordering VoIP services. The customer may be ordering a single telephone number, or may be ordering multiple telephone numbers. For orders of a very large block of telephone numbers, the interface may provide a manner for the telephone numbers to be requested by indicating a numerical range.

Figure 4:
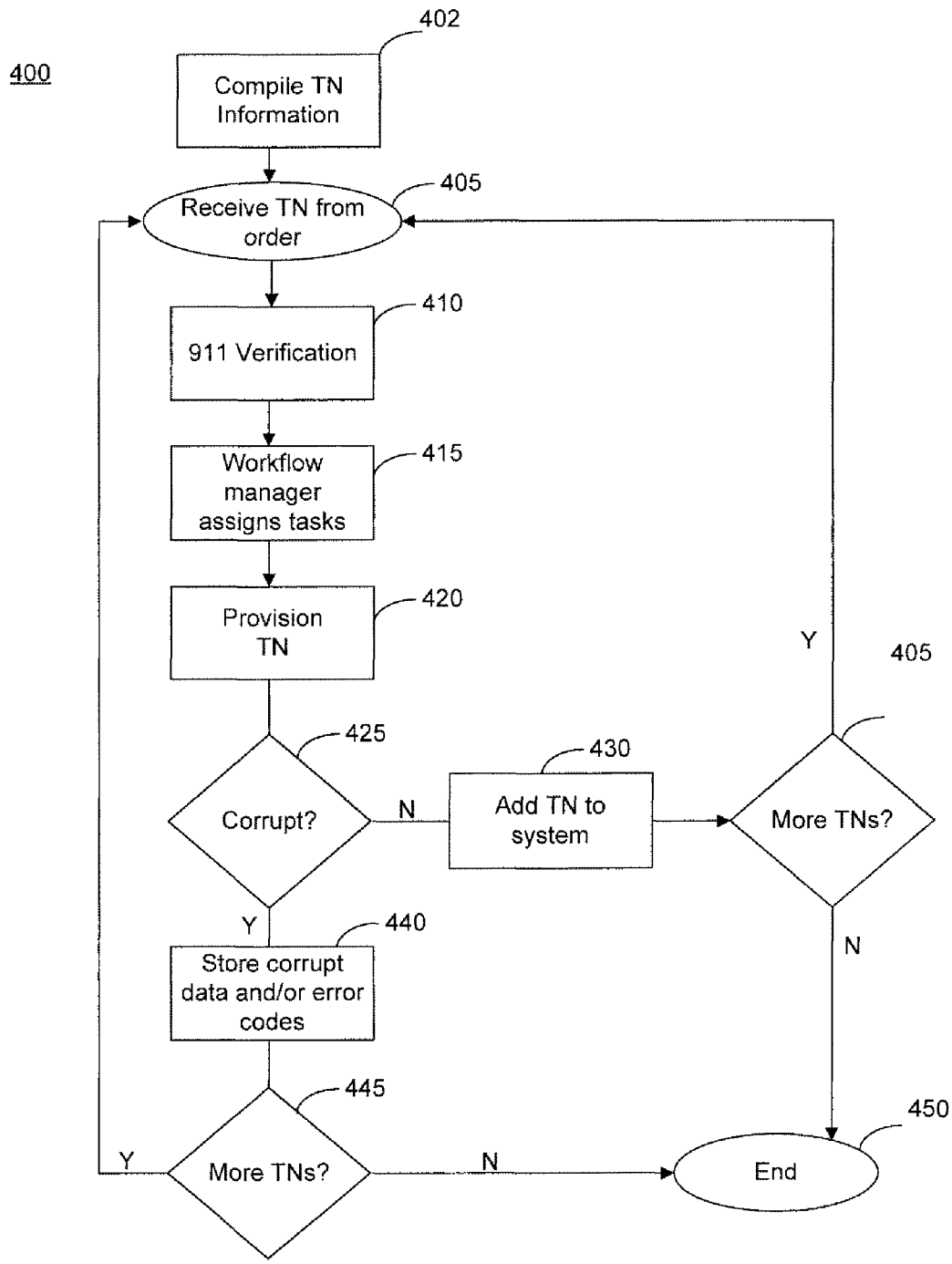
FIG. 4 depicts a flowchart for a method of validating the telephone numbers in an order for telephone numbers in a VoIP system, in accordance with an exemplary embodiment.

FIG. 4 depicts a flowchart for a method 400 of validating the telephone numbers in an order for telephone numbers in a VoIP system, in accordance with an exemplary embodiment. Box 402 shows compiling telephone number information. This compilation is performed first so that the process of validating requested telephone numbers can be performed by comparing the requested numbers to a fully compiled database of numbers that are not able to be assigned because the numbers are already taken, pre-allocated for a different use, or otherwise unavailable. As is described above in the discussion of data compilation module 218, the numbers may be compiled from switches and IP databases.

In box 405, an order for at least one telephone number may be received from a customer. A customer may place an order for telephones numbers using a communications device or computing device (shown as elements 106 and 102 in FIG. 1). An interface, such as the interface depicted in FIG. 3, may be provided to help facilitate the customer's order of telephone numbers. In box 410, an address of the at least one requested telephone number is verified for 911 purposes. The process of verifying an address corresponding to the requested telephone number may include accessing an external repository that includes this information.

As depicted in box 415, a workflow management tool may delegate the task of provisioning the requested number and determining whether the telephone number is corrupt to IP and switch provisioning systems. For an order that includes multiple phone numbers, the workflow manager may update internal or external system directories when the provisioning and corruption determination processes have been completed for one phone number, and may then proceed to send the next telephone number to the provisioning systems. This process may continue on until all requested telephone numbers have been processed.

As depicted in box 420, a newly-requested telephone number may be provisioned. The provisioning may include both switch provisioning and IP provisioning. The provisioning may be performed by a provisioning module (such as provisioning module 216 shown in FIG. 2). The above discussion of provisioning module 216 describes the two-track provisioning process in greater detail. The provisioning process may also include a determination of whether a requested telephone number is valid or has been corrupted for some reason. A telephone number may be considered invalid or corrupt if the telephone number is already in use. A telephone number may also be considered invalid or corrupt if the telephone number has been deemed inactive or has been pre-allocated for another purpose. As discussed with respect to the corruption determination module 220 (as shown in FIG. 2), the step of determining whether a newly requested telephone number is valid (which is illustrated in decision box 425) may include comparing the number to a compiled database of telephone numbers.

In the event that the order includes multiple telephone numbers, and a single telephone number of the multiple telephone numbers is determined to be valid, the processing will proceed on the next telephone number in the order, as depicted in boxes 430 and 435. Further, when the order includes multiple telephone numbers and one of the telephone numbers is determined to be corrupt, the corrupt telephone number and any error codes indicating the reason for the invalidity of the telephone number are set aside and stored in a pre-allocated storage space. This is depicted at box 440. Because the information regarding the corrupt telephone number is set aside for later review, the method may continue processing any additional telephone numbers, as is illustrated in box 445. This way, a single corrupt telephone number does not interrupt the processing of a large order of telephone numbers.

The description above describes user devices, an analysis system, a communication network having network elements that are coupled to each other via one or more links (e.g., physical or logical), various networks of within a domain of the communication network, and other elements for coupling customers to the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
   compiling telephone number information corresponding to at least one Class 5 local switch and at least one packet switched network;
   storing the compiled telephone number information in a computer readable storage medium;
   receiving an order from a customer for at least one telephone number in a VoIP system;
   provisioning the at least one telephone number for both the at least one packet switched network and the at least one Class 5 local switch;
   producing an error code indicating a reason the telephone number is corrupt in response to a determination that the at least one telephone number is corrupted;
   allocating computer readable storage configured to store information regarding corrupted telephone numbers, wherein the stored information comprises the error code indicating a reason the telephone number is corrupt; and
   storing the information regarding a corrupted telephone number in the allocated computer readable storage if the determination is made that the telephone number is corrupted, wherein processing of the received order proceeds without requesting that the customer provide a new telephone number to replace the corrupted telephone number.

2. The method according to claim 1, wherein the determination of whether a telephone number is corrupt comprises comparing the telephone number against the compiled telephone number information.

3. The method according claim 1, wherein the telephone number information corresponding to the at least one packet switched network is stored at a packet switched network provisioning server.

4. The method according to claim 1, wherein the determining whether the at least one telephone number is corrupted is a part of the provisioning process.

5. The method according to claim 1, wherein a telephone number is considered corrupt if it is already taken.

6. The method according to claim 1, where in a telephone number is considered corrupt if it has been deactivated as an available number.

7. The method according to claim 1, wherein a telephone number is considered corrupt if it has been pre-allocated for another purpose.

8. The method according to claim 1, wherein the at least one packet switched network is a VoIP network.

9. A non-transitory computer readable media comprising code to perform the steps comprising:
   compiling telephone number information corresponding to at least one Class 5 local switch and at least one packet switched network;
   storing the compiled telephone number information in a computer readable storage medium;
   receiving an order from a customer for at least one telephone number in a VoIP system;
   provisioning the at least one telephone number for both the at least one packet switched network and the at least one Class 5 local switch;
   producing an error code indicating a reason the telephone number is corrupt in response to a determination that the at least one telephone number is corrupted; and
   allocating computer readable storage configured to store information regarding corrupted telephone numbers, wherein the stored information comprises the error code indicating a reason the telephone number is corrupt; and
   storing the information regarding a corrupted telephone number in the allocated computer readable storage if the determination is made that the telephone number is corrupted, wherein processing of the received order proceeds without requesting that the customer provide a new telephone number to replace the corrupted telephone number.

10. A system, comprising:
    an interface for receiving electronic data associated with an order for at least one telephone number for VoIP service;
    a processor communicatively coupled to the interface, wherein the processor is configured to:
        provision the at least one telephone number for both the at least one packet switched network and the at least one Class 5 local switch;
        determine whether the at least one telephone number is corrupted and, if the telephone number is corrupt, producing an error code indicating the reason the telephone number is corrupt;
        allocate computer readable storage configured to store information regarding corrupted telephone numbers, wherein the stored information comprises the error code indicating a reason the telephone number is corrupt; and
        store the information regarding a corrupted telephone number in the allocated computer readable storage if the determination is made that the telephone number is corrupted, wherein processing of the received order proceeds without the processor requesting that the customer provide a new telephone number to replace the corrupted telephone number.

\* \* \* \* \*